Patented July 28, 1953

2,647,132

UNITED STATES PATENT OFFICE 2,647,132

COUMARIN DERIVATIVES

Robert Sidney Long, Bound Brook, N. J., and Carleton Alfred Sears, Stamford, Conn., assignors to American Cyanamid Company, New York, N. Y., a corporation of Maine No Drawing. Application May 17, 1952,
Serial No. 288,559

8 Claims. (Cl. 260—343.2)

The present invention relates to a new class of compounds which are useful for the whitening of wool and silk and synthetic fibers such as nylon and cellulose acetate.

These fibers generally have a slight yellow cast and, as the material becomes older, the yellow hue develops further and is not removed by laundering or dry cleaning. This same yellowing is characteristic of cellulosic fibers, and numerous products have been recommended recently for the optical bleaching of such materials. These optical bleaching agents function by absorbing ultraviolet light and re-emitting it in the form of visual light of such a wave length or hue that it neutralizes the yellow cast and gives a pure white fabric. The products which have been used for cellulosic fibers have been largely derivatives of diaminostilbenedisulfonic acid and benzidine sulfone disulfonic acid.

Such products are of no value for the whitening of wool, silk, and synthetic fibers, since they have little or no affinity for such fibers. There has been, therefore, a great need for products of modified structure which will have the desired property of absorbing ultraviolet light and converting it to visual light of the proper wave length, and, in addition, the property of having affinity for the above-mentioned fibers. One product which has been recommended for this purpose is 4-methyl-7-diethylaminocoumarin. This compound has the desired effect when used in sufficient amounts, but tends to give the fiber a pink cast, which is not desirable. This is particularly true in the case of cellulose acetate.

It is, therefore, an object of this invention to provide new whitening agents for these fibers which will not give an undesirable pink cast to the fiber. It is a second object of this invention to provide new whitening agents which will have greater fluorescence intensity, and which, therefore, can be used in smaller amounts. A third object of the invention is to provide new chemical compounds which may be useful for imparting fluorescent effects to other materials, such as plastics.

The products of this invention are represented by the general formula shown below:

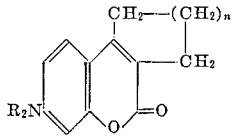

in which R is a lower alkyl group and $n$ is an integer greater than 0 and smaller than 3. As indicated above, the products are characterized, in general, by a surprisingly increased fluorescence intensity and by the fact that they do not impart an undesirable pink hue to the fibers to which they are applied.

Compounds of this type may be prepared by the condensation of a meta-dialkylaminophenol with cyclic beta-keto esters such as 2-carbomethoxycyclopentanone or 2 - carbomethoxycyclohexanone. This preparation may be represented by the general equation shown below:

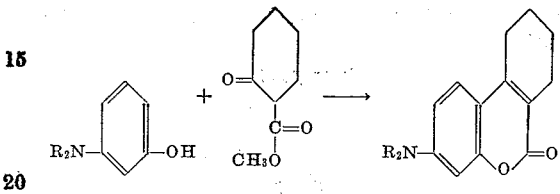

The alkyl groups attached to the amino nitrogen atom may contain from one to 18 carbon atoms, but we have discovered that the higher molecular weight alkyl groups diminish somewhat the fluorescent activity and therefore prefer starting material such that the total number of carbon atoms in the dialkylamino group does not exceed six. In the claims those alkyl radicals containing not more than six carbon atoms are defined as "lower alkyl radicals." Useful starting materials are meta-dimethylaminophenol, meta-diethylaminophenol, and meta-N-ethyl-N-methylaminophenol.

It is an advantage of the present invention that these varied condensations do not require special conditions, but proceed smoothly under the influence of an acid catalyst, such as zinc chloride. This would have been quite impossible to predict, since it is generally believed that the condensation proceeds through the enol form of the beta-keto ester, and since it is well-known that the presence of an alpha substituent in a beta-keto ester inhibits this enolization.

The very striking degree of fluorescence and the desirable shade of fluorescence exhibited by these compounds when they are applied to fibers such as wool, silk, nylon, and cellulose acetate does not admit of complete explanation in the present state of art, since theories of fluorescence are still somewhat incomplete. It was completely unpredictable that this particular combination of an alicyclic ring attached to the 3,4-position of the coumarin ring with a dialkylamino group present in the benzene ring should prove so strikingly effective. It is particularly noteworthy that even close chemical relatives are appreciably weaker in their fluorescence.

The present invention is further illustrated by the following examples in which parts are by weight unless otherwise specified:

*Example 1*

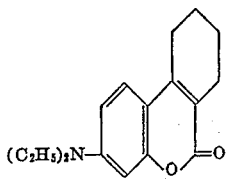

A mixture of 48.2 parts of m-diethylaminophenol, 52.8 parts of 2-carbethoxycyclohexanone, 40.5 parts of anhydrous zinc chloride, and 120 parts of ethanol was refluxed overnight, and then drowned in ice water and stirred thoroughly. The product was isolated by chloroform extraction, followed by fractional distillation to remove any unreacted starting material. The product may be purified by recrystallization of its sulfate from ethanol. The sulfate melts at approximately 233° C.

This product is resistant to soap, chlorine, light, etc., and is an excellent brightening agent for wool fiber when applied from an acid bath. It is approximately 40% stronger in fluorescence intensity than 4-methyl-7-diethylaminocoumarin. By using m-dimethylaminophenol in the above reaction, there is obtained similarly the expected 3,4-tetramethylene-7-dimethylaminocoumarin.

*Example 2*

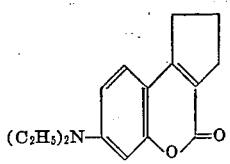

A mixture of 44.0 parts of m-diethylaminophenol, 50 parts of 2-carbomethoxycyclopentanone, and 19.2 parts of anhydrous zinc chloride was heated and stirred at 110° C. for approximately 20 hours. The resulting product was steam stripped, stirred thoroughly with aqueous sodium hydroxide, filtered, and washed. It may be recrystallized from aqueous acetone or from hexane, and melts at approximately 114° C. This product is essentially colorless in white light, but strongly fluorescent under the influence of ultraviolet rays such as are present in sunlight.

We claim:
1. Compounds having the formula:

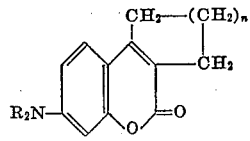

in which R is an alkyl group and $n$ is an integer greater than 0 and smaller than 3.

2. A compound of the formula:

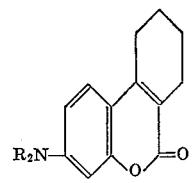

in which R is a lower alkyl group.

3. A compound of the formula:

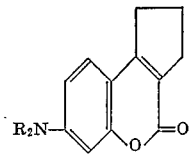

in which R is a lower alkyl group.

4. A compound of the formula:

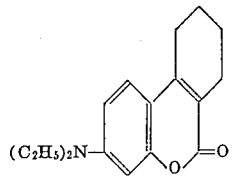

5. A compound of the formula:

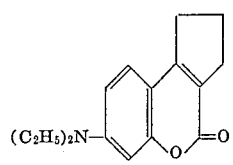

6. A compound of the formula:

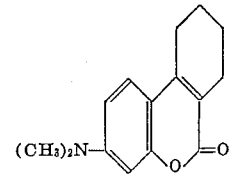

7. A compound of the formula:

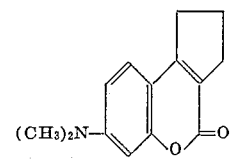

8. A compound of the formula:

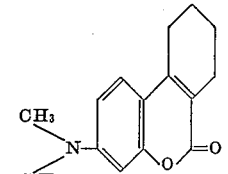

ROBERT SIDNEY LONG.
CARLETON ALFRED SEARS.

No references cited.